Aug. 8, 1950  L. W. GACKI ET AL  2,517,781
CAMERA

Filed Sept. 5, 1945  7 Sheets-Sheet 1

INVENTORS
LEONARD W. GACKI
CARL J. BRASSER
BY
Blair, Curtis & Hayward
ATTORNEYS

Aug. 8, 1950    L. W. GACKI ET AL    2,517,781
CAMERA
Filed Sept. 5, 1945    7 Sheets-Sheet 3

INVENTORS
LEONARD W. GACKI
CARL J. BRASSER
BY
Blair, Curtis + Hayward
ATTORNEYS

Aug. 8, 1950  L. W. GACKI ET AL  2,517,781
CAMERA
Filed Sept. 5, 1945  7 Sheets-Sheet 4

INVENTORS
LEONARD W. GACKI
CARL J. BRASSER
BY
Blair, Curtis & Hayward
ATTORNEYS

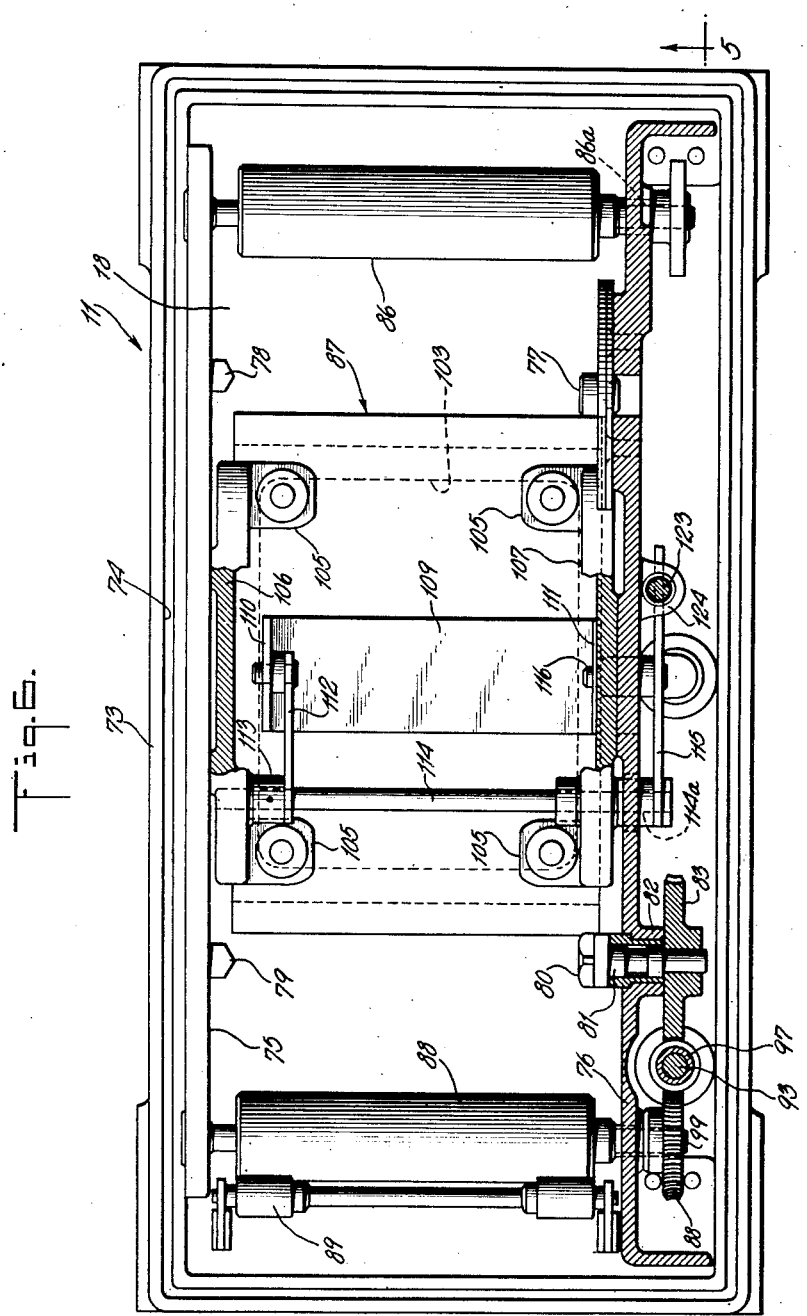

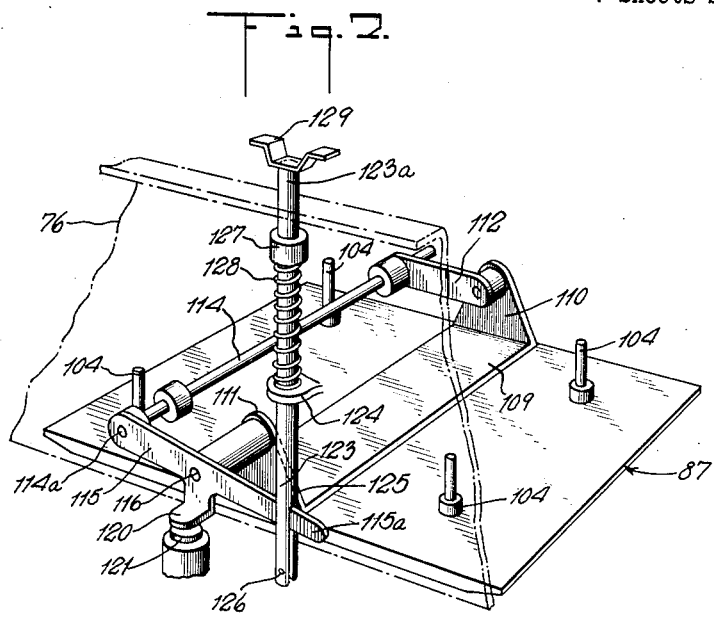
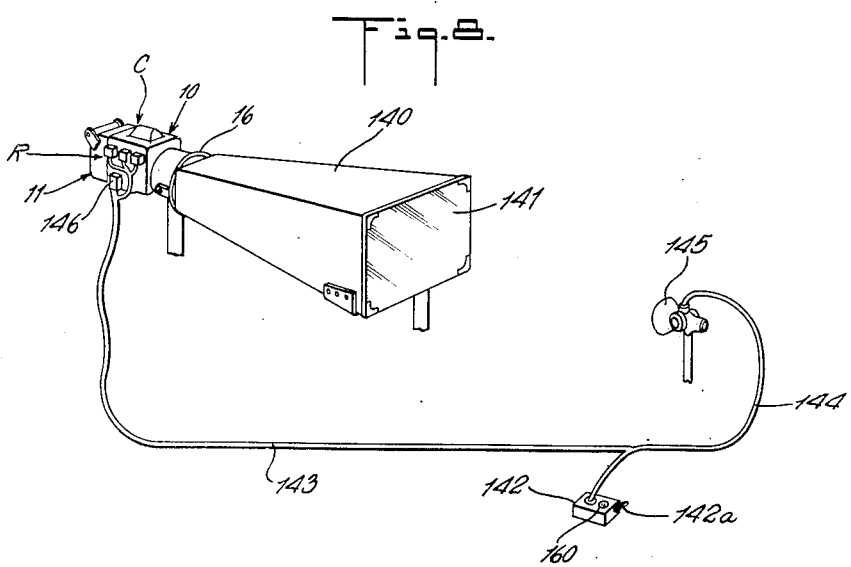

Aug. 8, 1950  L. W. GACKI ET AL  2,517,781
CAMERA
Filed Sept. 5, 1945  7 Sheets-Sheet 7

INVENTORS
LEONARD W. GACKI
CARL J. BRASSER
BY
Blair, Curtis & Hayward
ATTORNEYS

Patented Aug. 8, 1950

2,517,781

UNITED STATES PATENT OFFICE 2,517,781

CAMERA

Leonard W. Gacki and Carl J. Brasser, Jamaica, N. Y., assignors to Fairchild Camera and Instrument Corporation, Jamaica, N. Y., a corporation of Delaware Application September 5, 1945, Serial No. 614,538

3 Claims. (Cl. 250—65)

This invention relates to a camera, and more particularly to a camera for use in connection with a fluorescent screen to photograph X-ray images thereon.

In recent years it has been found desirable, and in various instances necessary to photograph the result of X-ray or fluoroscope surveys of large groups of people, particularly in connection with diagonsis and treatment of potential tuberculosis cases. Many problems were encountered in carrying out this work by reason of the shortcomings of the available photographic equipment which was but indifferently adapted for use with the X-ray apparatus. The conventional, i. e., hospital type of equipment, was found unsuitable for survey work because of its massiveness, slowness of operation, individual plates or cut films, and inconvenient picture size, rendering classification and storage of the negatives difficult. On the other hand, where very small cameras, i. e., 35 mm. cameras, adapted to this type of work were used, the results were in many instances unsatisfactory because the small images failed to indicate certain conditions which would have been apparent on larger sized film. Then too, regardless of the size of camera used, it would not infrequently happen where strip film was used that some of the first individuals of a group, and occassionally a few at the end of the group, were not photographed by reason of the fact that the film strip was not in proper position with respect to the camera aperture, or had become exhausted. Still other difficulties were encountered in lack of synchronization between the camera and the X-ray equipment, rendering the film changing portion of a cycle of operation slow and uncertain.

It is accordingly among the objects of this invention to provide a strip film camera for use with X-ray equipment which obviates the above difficulties as well as others. It is a further object to provide a camera of the above nature which is completely automatic in operation, so as to be able to take a large number of successive photographs without the necessity of reloading the camera with unexposed film. It is still another object of the invention to provide a camera of the above nature which is substantially foolproof in operation, so as to preclude the possibility of apparent exposure operation when there is no film in exposure position. Other objects will be in part apparent and in part pointed out hereinafter.

In the drawing, wherein there is shown one form of our invention,

Figure 6 is a horizontal section taken along the line 6—6 of Figure 5;

Figure 7 is a fragmentary perspective view of a portion of the film magazine showing the mechanism for controlling the pressure plate;

Figure 8 is a schematic perspective view showing the camera in combination with the X-ray apparatus; and, Figure 9 is a wiring diagram of the control circuit of the camera.

Figure 1:
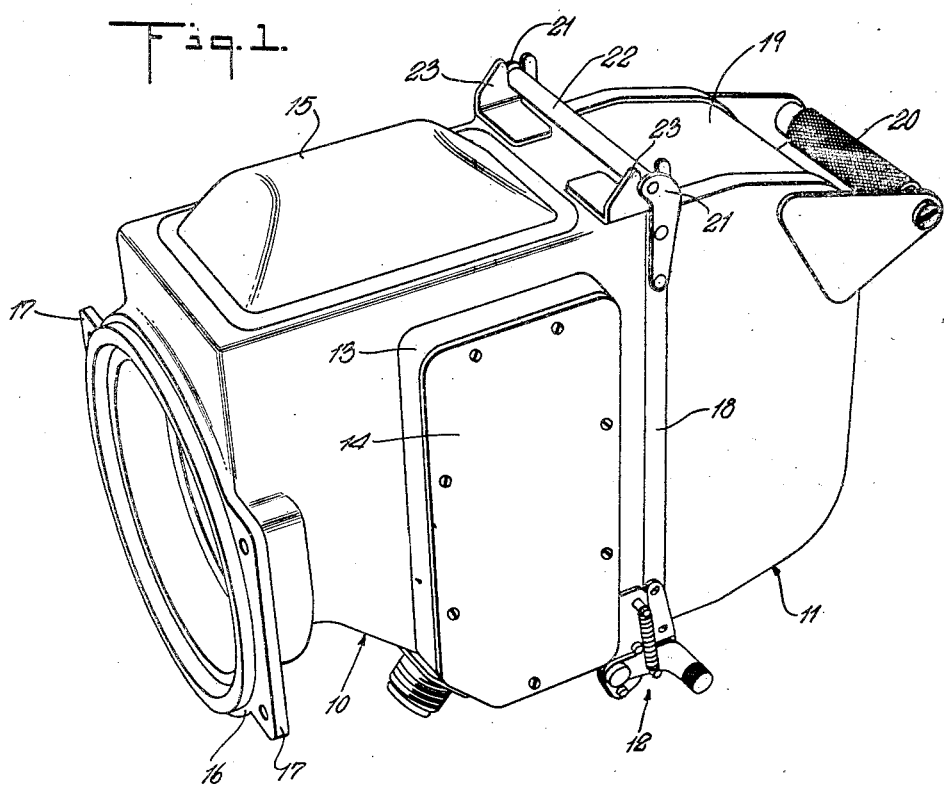
Figure 1 is a perspective view of the camera.

Referring first to Figure 1, the cemera comprises a body generally indicated at 10, and a film magazine generally indicated at 11, which is detachably connected to the camera body by latching mechanism generally indicated at 12. Camera body 10 has formed or attached to the side thereof a housing 13 in which is disposed certain driving and control mechanisms described in detail hereinafter, which are normally covered by a cover plate 14. The camera body also includes an upper housing 15 within which is disposed the driving motor of the camera, and also a flanged aperture 16, to the flanges 17 of which the fluorsecent screen housing may be attached, as will also be described hereinbelow. Magazine 11 is of the type capable of holding a substantial length of strip film, e. g., 70 mm. film which is automatically fed by increments.

Figure 2:
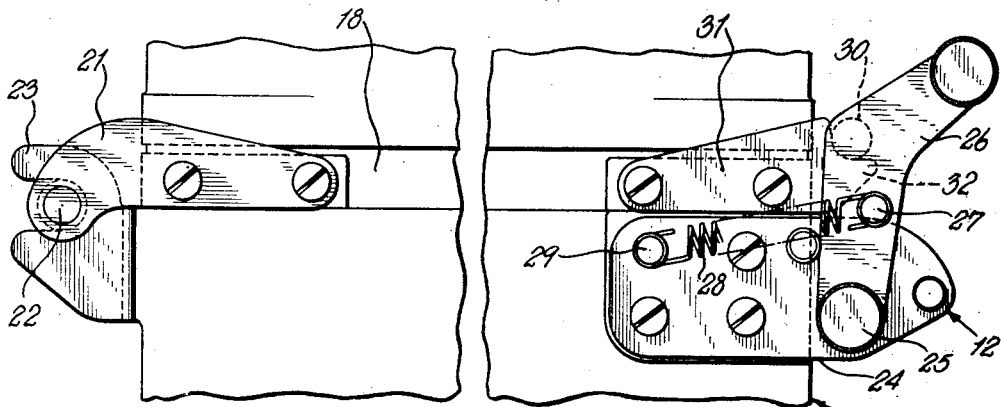
Figure 2 is an enlarged fragmentary side view of the mechanism by which the film magazine is attached to the camera body.
Figure 5:
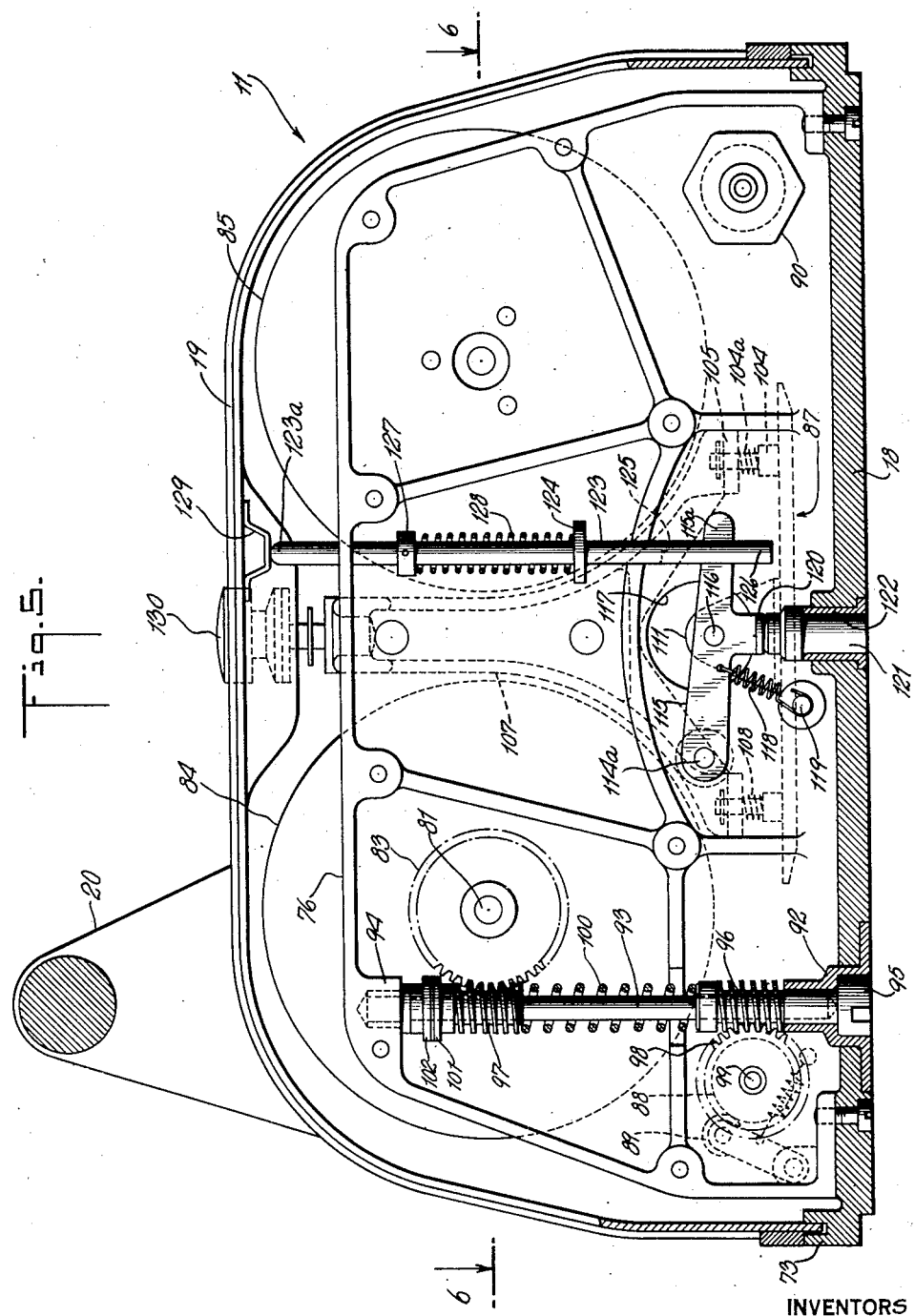
Figure 5 is a sectional elevation of the camera magazine taken along the line 5—5 of Figure 6.

As is better shown in Figure 5, magazine 11 includes a base 18 and a cover 19, to which is fastened a handle 20 (Figure 1). At the opposite sides of the upper end of base 18 are secured a pair of lugs 21, which support an attaching rod 22 adapted to be received in bifurcated brackets 23 fastened to camera body 10 when magazine 11 is attached to the camera body. As is better shown in Figure 2, at each side of the lower right-hand end of camera body 10 is fastened a plate 24 which projects below the camera body and carries a stud 25 forming a pivotal attachment for a latching arm 26. To this arm is secured a pin 27 which constitutes an anchor for one end of a spring 28, the other end of which is fastened to a pin 29 secured to and projecting from plate 24. Latching arm 26 also carries an inwardly projecting latching pin 30 adapted to engage behind a latch plate 31 fastened to the lower part of magazine base plate 18, the pin and latch thus holding the magazine securely to the camera body when in the position shown in Figure 2. As noted above, the other side of camera body 10 includes latching mechanism similar to that just described. Latch plate 31 includes a cam surface 32 which rides against latch pin 30 when the magazine is being installed, forcing the pin and accordingly arm 26 downwardly against the bias of spring 28 until the pin underrides the bottom of the latch plate, whereupon spring 28 swings arm 26 counterclockwise so as to engage pin 30 behind latch plate 31. Thus it follows that the axis of rotation of the camera magazine during its attaching movement is displaced a substantial distance from the center of mass of the magazine in the direction of its locking movement so that the magazine readily falls into its secured position where it tends to remain against inadvertent displacement by reason of the offset of the said axis of rotation from the center of mass. Furthermore, with reference to Figure 1, wherein the camera is shown in its operative position, the disposition of rod 22 at the top of the magazine renders installation thereof on the camera body not only easy, but also relatively certain in spite of the rather substantial weight of the loaded magazine.

Figure 3:
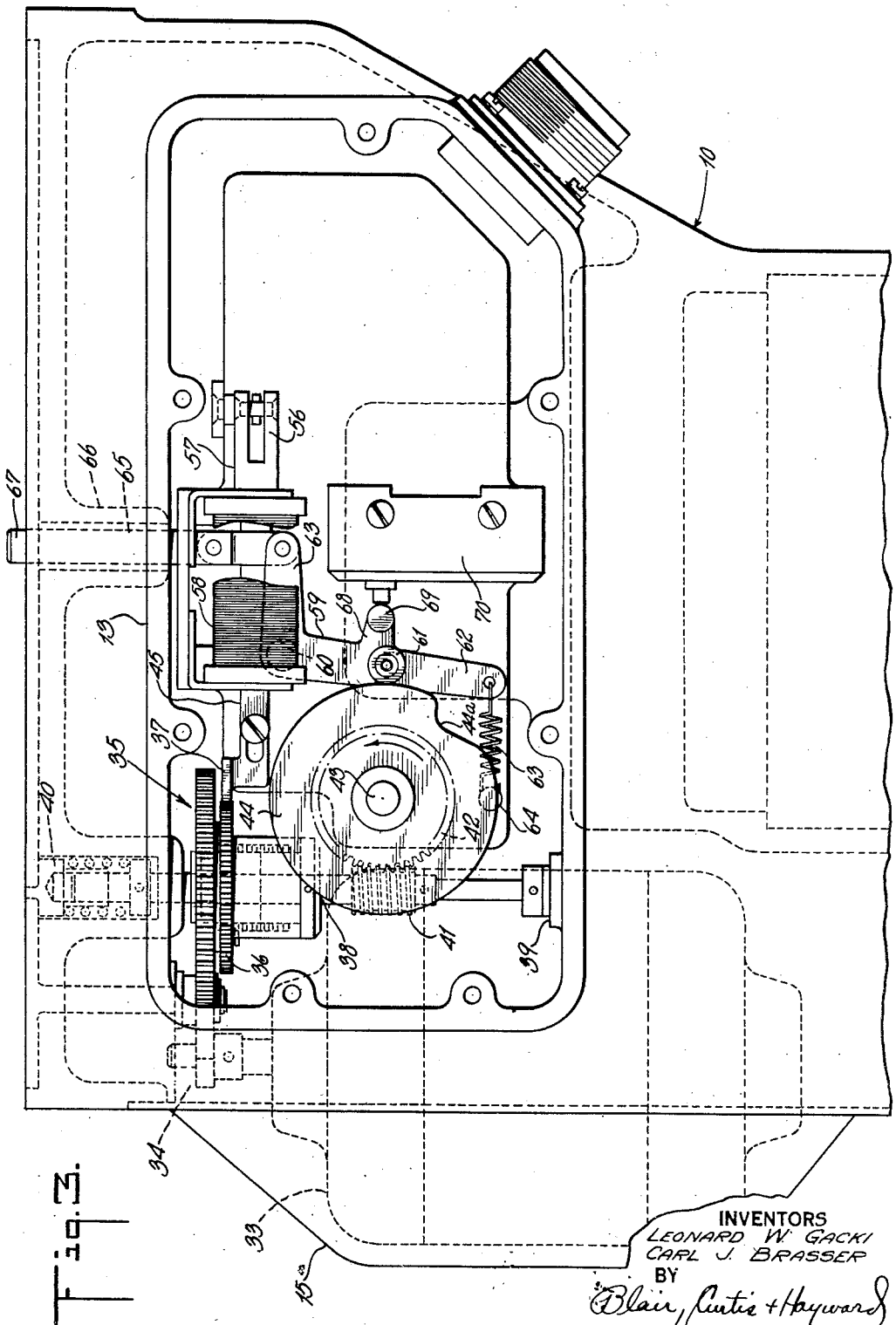
Figure 3 is an enlarged fragmentary side view of the camera, as viewed in Figure 1, with the side cover plate removed to show the driving mechanism.

Referring now to Figure 3, a driving motor is mounted partially in camera body 10 and partially in housing 15 in any suitable manner, and is connected by way of reduction gearing 34 to a clutch generally indicated at 35. This clutch is preferably of the conventional spring and ratchet type such, for example, as is disclosed in the Weiblen et al Patent No. 2,131,926, and accordingly includes a ratchet 36 which, when engaged by a pawl 37, results in disengagement of the clutch. When the ratchet and pawl are disengaged, the clutch is engaged and accordingly a shaft 38 to which the driven element of the clutch is secured, is rotated. One end of this shaft 38 is rotatably mounted in a suitable boss 39, formed in the camera body, while the other end thereof carries a coupling 40. Also secured to shaft 38 is a worm 41 which meshes with a worm wheel 42 secured to, so as to rotate a shaft 43, which is rotatably mounted in the mechanism housing 13 in any suitable manner. Also fastened to shaft 43 is a cam 44 which, as will be described hereinafter, controls the film magazine pressure plate by which the film is firmly and flatly held in proper exposure position in the focal plane during exposure.

Pawl 37 is formed on the end of a bar 45 which is slidably attached to a side 10a (Figure 4) of the camera body as by a pair of screws 48 and 49. On the other end of bar 45 is an ear 50, which is pivotally attached as by a pin 51 to one end of a lever 52 fulcrumed on a pin 53 secured to a lug 54 extending from camera body side 10a. The other end of lever 52 is bifurcated to straddle a pin 55 fastened in the slotted end 56 of a rod 57, this rod forming a portion of the armature of a solenoid 58. It may now be seen that when solenoid 58 is energized its armature and accordingly rod 57 is drawn to the left, as viewed in Figure 3. This movement of the rod pivots lever 52 clockwise, as viewed in Figure 4, and accordingly draws slide bar 45 to the right, thus disengaging pawl 37 from ratchet wheel 36, causing clutch 35 to engage. This, as noted above, permits motor 33 to drive shaft 38, and accordingly operate the film magazine, as will be described below.

Cam 44 (Figure 3) operates a bell crank 59 pivotally mounted on a pin 60 through engagement with a follower 61 carried by one arm 62 of the bell crank. A spring 63 is fastened at one end to bell crank arm 62, and at the other end to a stationary pin 64 which constantly biases the bell crank 59 clockwise, and accordingly holds its follower 61 in engagement with the periphery of cam 44. The other arm 62a of the bell crank is pivotally connected to the lower end of a rod 65 slidably mounted in a guide boss 66; the upper end 67 of this rod controls the film magazine pressure plate. It should be noted at this point that bell crank 59 includes an ear 68 which carries a pin 69, which pin, when the bell crank is in the position shown, throws a switch 70, for a purpose to be described. When, however, the bell crank follower 61 falls into portion 44a of the cam, pin 69 is withdrawn from the plunger of switch 70, the switch thus being thrown in the opposite direction, as will be described in more detail below.

Figure 4:
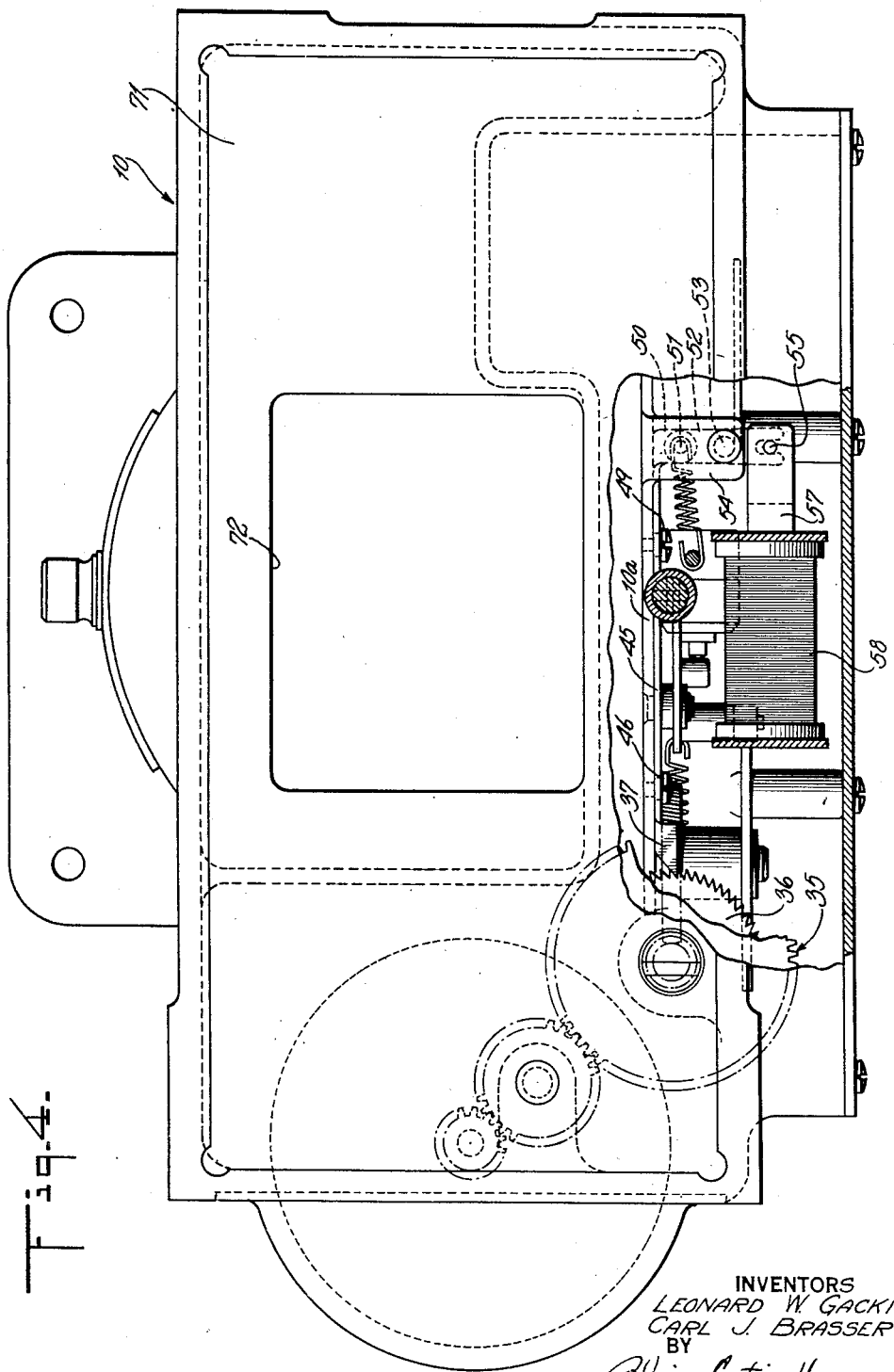
Figure 4 is an elevation of the right-hand side of the camera body as viewed in Figure 1 with the film magazine removed, a portion being broken away and shown in section.

As shown in Figure 4, camera body 10 is provided with a side plate 71 in which is formed an aperture 72, past which the film is fed when the magazine is attached to the body. The camera magazine as shown in Figure 5 includes an upwardly extending flange 73, which flange, as shown in Figure 6, is provided with a groove 74 that extends around the four sides of the magazine base 18 to provide a light-tight seat for magazine cover 19 (Figure 5). Secured to and extending upwardly from magazine base 18 are spaced walls or partitions 75 and 76, and these plates rotatably support film spool spindles 77, 78, 79 and 80, the latter of which is fastened to one end of a stud shaft 81 which extends through a boss 82 in wall 75 and has fastened to its other end a worm wheel 83, by which the said shaft 81, and accordingly the spindle 80, is driven. Spindles 79 and 80 receive a take-up spool 84 (Figure 5) while the other pair of spindles carry a film supply spool 85 from which the film is fed over the focal plane and past a suitable aperture therein, to be rewound on spool 84. In being fed from one spool to another, the film passes under an idler roller 86 (Figure 6) rotatably mounted between walls 75 and 76, thence under a pressure plate generally indicated at 87, then under a metering roller 88 beneath pressure rollers 89 which tightly press the film against roller 88. From rollers 88 and 89 the film then passes to take-up spool 84 (Figure 5) to which it is attached in the conventional manner. It might here be noted that the shaft 86a on which roller 86 is mounted extends through wall 76, and has attached thereto a cam 90, the rises of which are adapted to operate a micro-switch 91 which, in turn, causes a blinker to blink, indicating film motion.

Magazine base 18 is bored to receive a bushing 92 which forms the lower bearing of a drive shaft 93, the upper end of this shaft being rotatably supported in a boss 94 forming an integral part of plate 76. To the lower end of shaft 93 is fastened a female coupling 95 which, when the magazine and camera body are secured together, mates with coupling 40 (Figure 3) to provide a driving connection from motor 33 to shaft 93 (Figure 5). This shaft 93 also carries a pair of worms 96 and 97, the former of which meshes with a worm wheel 98 secured to a shaft 99, on which metering roller 88 is mounted, and the latter of which meshes with worm wheel 83. Worm 97, however, is slidably mounted on shaft 93 so as to be able to move axially thereof, being biased upwardly, however, by a spring 100, so that a friction plate 101 at the top of the worm is forced into engagement with a complementary focus plate or disc 102 secured to the upper end of shaft 93. Thus it may be seen that worm 97 is driven through the friction discs 101 and 102 when the friction there between exceeds the load on take-up spool 84. It accordingly follows that the take-up spool is driven intermittently, i. e., only when there is slack film between it and the metering roll, thus to accommodate the varying diameters of the film supply and take-up spools.

As noted hereinabove, a pressure plate 87 is provided. This plate is located over an aperture 103 in the magazine base 18, and this aperture, of course, registers with aperture 72 (Figure 4) in the camera body when the magazine is attached thereto. At all times, except when fresh film is being wound from the supply to the take-up spool, pressure plate 87 is down, i. e., is pressing the film firmly against magazine base 18 over aperture 103 to hold the film in a smooth, flat condition to avoid distortion. The pressure plate is thus pressed by means of cam 44 (Figure 3) bell crank 59 and rod 65, by mechanism now to be described.

As shown in Figures 5, 6 and 7, the pressure plate has secured thereto four upstanding posts 104, the upper ends of which are reduced (see Figure 5) as at 104a, and extend upwardly through feet 105 carried at the bottom of a pair of bifurcated brackets 106 and 107 which are respectively secured to side plates 75 and 76. Each of posts 104 carries a coiled spring 108 coiled around the reduced portions of the posts and lying below feet 105 so as to impart a constant downward bias to pressure plate 87. Pressure plate 87 also has secured thereto a plate 109 (Figure 6) provided with upstanding flanges 110 and 111 at the opposite ends thereof. To the former of these is pivotally fastened one end of a lever 112, the other end of which is secured to a collar 113 which is pinned to a shaft 114. The opposite ends of this shaft are rotatably mounted in brackets 106 and 107, end 114a of the shaft extending through the bracket and through plate 76. This end of the shaft has fastened thereto one end of a lever 115, this lever being secured to plate bracket 111 by a pin 116 which extends from the lever through a hole 117 (Figure 5) formed in side plate 76. A spring 118 has one of its ends fastened to lever 115, and the other anchored to a post 119 secured in plate 76, and this spring constantly biases the lever clockwise, as viewed in Figure 5, thus to hold a foot 120, which is a part of the lever, against the top of a pin or plunger 121, reciprocably mounted in a bushing 122 carried by magazine base 18. This plunger 121 registers with the outer end 67 (Figure 3) of rod 65 and accordingly completes the connection between cam 44 and pressure plate 87. Thus it may now be seen that when cam 44 is rotated, so as to force follower 61 out of cam portion 44a, bell crank 59 is rocked counterclockwise, as viewed in Figure 3, and rod 65 is projected upwardly, as viewed in this figure. This movement of the rod is imparted to plunger 121 (Figure 5) which is, in turn, forced upwardly, as viewed in this figure, to rock lever 115 counterclockwise. This, in turn, rotates shaft 114 counterclockwise (see also Figure 6) so that lever 112 is lifted. Thus both levers 112 and 115 are rocked away from the focal plane, and as these levers are connected to the pressure plate, the plate is in turn lifted away from the focal plane against the pressure of springs 108 (Figure 5) thus to permit free passage of the film beneath the pressure plate.

In order to facilitate threading new film beneath the pressure plate, we have provided a rod 123 reciprocably mounted in a guide 124 (Figure 6) which extends outwardly from side plate 76. The lower end of this rod (see Figure 5) is slotted as at 125, and through this slot extends the free end 115a of lever 115, the bottom of the slot in rod 123 being closed by a pin 126. Rod 123 also has fastened thereto a collar 127 between which and guide 124 is disposed a spring 128 coiled around rod 123 and accordingly constantly biasing the rod upwardly, as viewed in Figure 5. The upper end 123a of the rod bears against a U-shaped bracket 129 fastened to the underside of magazine cover 19. It may now be seen that when cover 19 is in position on the magazine wherein it is held by a thumb screw 130, bracket 129 forces rod 123 downwardly and accordingly moves the pin 126 at the bottom of the rod away from lever 115, thus to permit free movement of the lever. When, however, the magazine cover is removed, and rod 123 is relieved of the restraint of bracket 129, spring 128 forces the rod upwardly, as viewed in Figure 5, so that pin 126 engages beneath lever 115 and rocks the lever counterclockwise, thus to lift pressure plate 87 from its seat in the manner hereinbefore described. Thus it may be seen that the pressure plate is automatically lifted away from its seat when the magazine cover is removed, thus greatly facilitating the installation of unexposed film.

The entire cycle of operation is constituted as follows: After an exposure, during which the pressure plate is seated, and follower 61 (Figure 3) is in cam portion 44a, motor 33 is automatically energized in a manner which will be described, and at the same time clutch 35 is engaged by reason of the simultaneous energization of solenoid 58. Accordingly, shaft 39 is driven to cause rotation of cam 44. This immediately rocks bell crank 59, and in the manner hereinbefore described, raises the pressure plate from its seat. Also, shaft 93 (Figure 5) is driven so that metering roll 88, as well as the film take-up spool 84, are rotated. The metering roll draws film from the supply spool 85 beneath the raised pressure plate, the film being wound on the take-up spool 84 until sufficient film has been fed to properly position an unexposed portion over the camera aperture. At such time, the motor circuit is automatically broken by switch 70 (Figure 3) and all mechanisms come to rest, the pressure plate again being seated to hold the film flat in the focal plane.

As noted hereinbefore, the camera described is adapted for use in connection with X-ray equipment. As shown in Figure 8, the camera which is generally indicated at C is attached as by its mounting flange 16 to a cone or hood 140 which includes a fluorescent screen 141. An operator's switch box or control 142 is electrically connected as by cables 143 and 144, respectively, to the camera and to an X-ray tube 145. When the switch in the control box 142 is turned on, tube 145 is energized so as to emanate X-rays, which are projected on screen 141 which fluoresces. At the same time the camera photographs the image on the fluorescent screen. When the exposure has been made and current to tube 145 has been turned off, the camera is automatically operated by a system of relays generally indicated at R, and described hereinbelow, to cause the exposed portion of the film to be moved out of, and a succeeding portion of unexposed film to be moved into exposure position.

Figure 9:
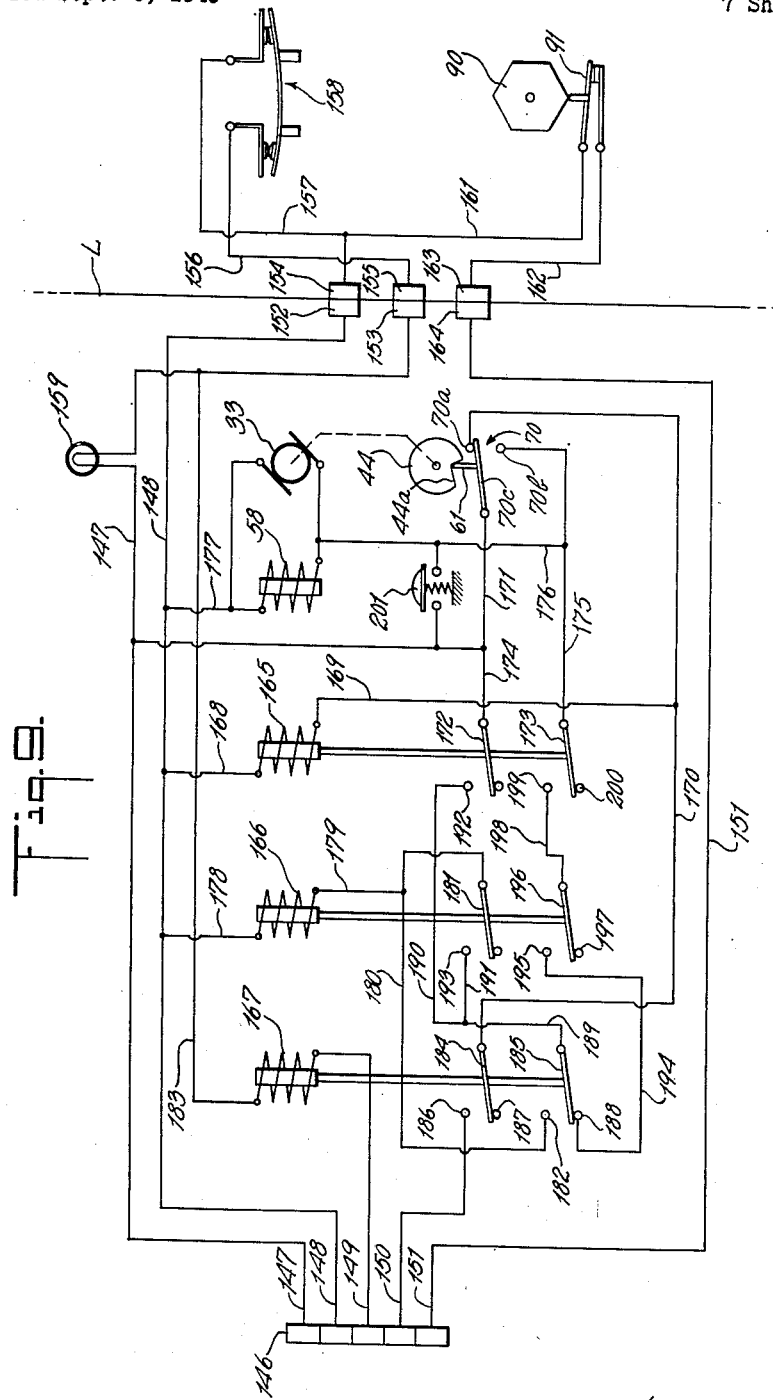

In the wiring diagram shown in Figure 9, that portion of the control circuit including the relays R which are housed in the camera body 10 are on the left of the vertical dot-dash line L, while that portion of the circuit which is at the magazine lies to the right of the line L. A socket 146 has connected thereto leads 147, 148, 149, 150 and 151, leads 147 and 148 being connected to a source of current when the cable 143 (Figure 8) is plugged in. These two leads are also connected respectively to a pair of contacts 152 and 153 on the camera body which engage with a pair of contacts 154 and 155 on the magazine when the magazine is attached to the camera body. It follows that if the magazine is not on the camera body, or is improperly positioned thereon, the circuit including leads 147 and 148 cannot be completed. Hence it is impossible to operate the camera if the magazine is not in proper operative position thereon. Furthermore, connected to contacts 154 and 155 are a pair of leads 156 and 157 which are connected to opposite sides of a switch generally indicated at 158. This switch may be of the type shown in Petit et al. 1,963,095, and accordingly is designed to complete the circuit, which includes a signal light 159, when there is live film in proper exposure position in the magazine.

Lead 149 is connected by way of cable 143 (Figure 8) to control box 142, and transmits power therefrom when a push button 142a is pressed. Lead 150 (Figure 9) is connected by way of cables 143 and 144 to X-ray tube 145 to transmit power thereto for energization of the tube. Lead 151 is connected by way of cable 143 to a film indicator light 160 on the control box 142, and this light blinks intermittently as flasher cam 90 (Figure 9) intermittently opens and closes switch 91, the circuit through the switch including a lead 161 connected to contact 154; a lead 162 connects the other side of the switch to a magazine contact 163 which, when the magazine is on the camera body, mates with a contact 164 to which lead 151 is connected.

The power circuit which includes leads 147 and 148 preferably includes a main switch (not shown) which may be located in any convenient position, for example, the switch may be included in control box 142 (Figure 8) and accordingly when closed completes the circuit, including lead 147 and 148, assuming, of course, that the magazine is in proper position and switch 158 is closed.

Relays R (Figure 8) include relays 165, 166 and 167. Relay 165 is connected at one side by a line 168 to lead 148, the other side of the relay being connected by a line 169 to a lead 170, this latter lead being connected to one of a pair of stationary contacts 70a and 70b of switch 70. When cam 44 is in the position shown, a movable contact 70c of switch 70 engages stationary contact 70a, the movable contact being connected by a line 171 to lead 147. Thus with leads 147 and 148 energized, a circuit through relay 165 is completed. Relay 165 controls a pair of switch arms 172 and 173, connected respectively to leads 174 and 175, the former being connected to lead 171, while the latter is connected to the other stationary contact 70b of switch 70. Lead 175 is also connected by lead 176 to one side of motor 33 and to one side of the clutch release solenoid 58, the other sides of these two elements being connected by a lead 177 to line 148.

Relay 166 is connected by a lead 178 to line 148 and by a lead 179 to a wire 180, the opposite ends of this wire being connected respectively to a switch arm 181 and a terminal or contact 182.

Relay 167 is connected at one side by a lead 183 to line 147, the other side of this relay being connected to lead 149 which, as noted above, is connected to the push button in control box 142 (Figure 8). Relay 167 (Figure 9) controls a pair of switch arms 184 and 185 which, when the relay is energized, engage contacts 186 and 182, respectively. When relay 167 is deenergized, these switch arms respectively engage contacts 187 and 188. Switch arm 184 is connected to lead 170, while switch arm 185 is connected by a lead 189 to leads 190 and 191, respectively connected to contacts 192 and 193. These contacts are respectively engaged by switch arms 172 and 181 when relays 165 and 166 are energized.

Contact 188 is connected by a lead 194 to a contact 195, which is engaged by a switch arm 196 when relay 166 is energized. When this relay is deenergized, arm 196 engages a contact 197. Switch arm 196 is connected by a lead 198 to a contact 199, which is engaged by switch arm 173 upon energization of relay 165. When relay 165 is deenergized, switch arm 173 engages a contact 200.

In operation, when the main switch is turned on, lines 147 and 148 carry power to energize relay 165 which, as noted above, is connected across the power lines. Nothing further, however, happens until push button 142a in control box 142 is depressed. When this occurs a circuit is completed through relay 167 and switch arms 184 and 185 are drawn against contacts 186 and 182, respectively. It should also be noted that energization of relay 165 resulted in switch arms 172 and 173 being engaged with contacts 192 and 199, respectively. With the several switch arms thus thrown, the following circuit is established: power line 147, lead 171, lead 174, switch arm 172, contact 192, lead 190, lead 189, switch arm 185, contact 182, lead 180, lead 179, relay 166 and lead 178 to the other side of the circuit, i. e., to line 148. Thus relay 166 is energized so that its associated switch arms 181 and 196, respectively, engage contacts 193 and 195.

The several relays and switch arms will remain in this condition until push button 142a (Figure 8) is released to break the circuit including line 149, and accordingly deenergizing relay 167. With relay 167 thus ultimately denergized, i. e., after the exposure period, its switch arms 184 and 185 move to the position shown in Figure 9. With the arms in this position, the following circuit is established: line 148, lead 177, motor 33 and clutch release solenoid 58, line 176, line 175, switch arm 173, contact 199, line 198, switch arm 196, contact 195, line 194, contact 188, switch arm 185, line 189, line 190, contact 192, switch arm 172, lead 171 to line 147, completing the circuit through the motor and clutch solenoid to effect energization thereof. With these elements thus energized, cam 44 starts to rotate as hereinbefore explained, and in a clockwise direction, as indicated by the arrow. Immediately switch arm 70c of switch 70 is moved into engagement with contact 70b thereof. When this occurs, a holding circuit is set up to maintain motor 33 and solenoid 58 energized. This circuit comprises line 147, lead 171, switch arm 70c, switch contact 70b, lead 175, lead 176, motor 33 and solenoid 58, lead 177 and line 148. It should also be noted that upon energization of relay 167, and the resultant engagement between its switch arms 184 and 185 with contacts 186 and 188, respectively, a power circuit to the X-ray tube 145 (Figure 8) is established as follows: line 147, lead 171, switch arm 70c, switch contact 70a, lead 170, switch arm 184, contact 186 and lead 150. This circuit, is of course, broken when relay 167 becomes deenergized upon release of the push button, which causes switch arm 184 and contact 186 to separate.

Relay 166 might be termed a holding relay, and remains energized subsequent to deenergization of relay 167. The holding circuit maintaining relay 166 energized is as follows: line 148, lead 178, relay 166, lead 179, lead 180, switch arm 181, contact 193, lead 191, lead 190, contact 192, switch arm 172, lead 174 and lead 171 to line 147.

As soon as cam 44 begins to rotate, switch arm 70c is forced out of engagement with contact 70a and into engagement with contact 70b. The disengagement of the switch arm and contact 70a breaks the circuit to relay 165 thus effecting deenergization of this relay to cause arms 172 and 173 to return to the position shown in the wiring diagram. When arm 172 thus disengages contact 192, the circuit through holding relay 166 is broken and this relay accordingly becomes deenergized.

However, disengagement of arm 173 from contact 199 does not result in deenergization of motor 33 or clutch solenoid 58, as a new circuit for these elements is established upon engagement of switch arm 70c with contact 70b as follows: power line 147, lead 171, switch arm 70c, switch contact 70b, lead 175, lead 176, motor 33 and solenoid 58, and lead 177 to line 148. This circuit, of course, is maintained until cam 44 completes one revolution, i. e., until the follower 61 drops into cam portion 44a, thus to break the newly established motor circuit. However, reengagement between switch arm 70c and switch contact 70a does not at this time establish a circuit to motor 33 and clutch solenoid 58, as this circuit cannot be reestablished until relay 167 is against energized. Of course, reengagement of switch arm 70c with switch contact 70a reestablishes a circuit through relay 165, as this is prerequisite to conditioning the first motor circuit for completion upon energization of relay 167. It accordingly follows that both the camera and X-ray equipment can be operated automatically and in foolproof manner from a position remote from the equipment, thus not only saving substantial time between successive exposures but also safeguarding the operator from X-ray burns.

As it is occasionally necessary or desirable to advance the film without making an exposure, a manually operable switch 201 is connected to leads 171 and 176, and accordingly when this switch is closed, motor 33 and solenoid clutch 58 are energized without, however, affecting any other portion of the circuit or the X-ray equipment.

It will now be seen that there has been provided an X-ray camera and system by which the several objects hereinbefore mentioned are accomplished in an entirely practical and efficient manner.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

What is claimed is:

1. In apparatus of the character described, in combination, an X-ray tube, a fluorescent screen, a camera associated with said screen to photograph images appearing thereon, said camera including a supply of sensitized film, a body, a detachable magazine and a film winding motor, a circuit including a source of power for said X-ray tube, a normally open motor circuit, means responsive to energization of said X-ray tube circuit for conditioning said motor circuit for subsequent energization, means responsive to deenergization of said X-ray tube circuit for energizing said motor circuit, means operable to prevent motor operation until said X-ray circuit has become deenergized, motor operated means for rendering said preventing means effective, a visual indicator, a switch having open and closed positions and responsive to the presence of film positioned for exposure in said camera, an indicator circuit connecting said visual indicator and said switch for energizing said visual indicator in accordance with the positioning of said switch, a first set of electrical contacts in fixed position on said body, a second set of electrical contacts on said magazine and adapted to be aligned with and in contact with said first set of contacts when said magazine is in a predetermined position relative to said body, a protective circuit including said contacts and said power circuit for permitting energization of said power circuit when said magazine is in said predetermined position, a visual blinker indicator, and a blinker circuit for causing said blinker indicator to flash off and on during the time said film in said camera is in motion.

2. A control circuit for a camera having a shutter and a roll film magazine for taking successive X-ray pictures, in combination, a first relay connected across a pair of power lines so as to be energized thereby, a main switch connected across said lines to effect energization of said relay when closed, a second relay connected across said power lines, an X-ray switch in the circuit of said second relay adapted when closed to effect energization thereof, a third relay connected across said power lines, switch means in the circuit of said third relay and operatively associated with said second relay and adapted to be closed upon energization of said second relay, thereby to energize said third relay, means forming a holding circuit including closable switch means operatively associated with said third relay adapted to be closed when said third relay is energized, said last-mentioned switch means including a portion associated with the circuit of said third relay and adapted to maintain said third relay energized when closed, whereby said third relay continues to be energized when said first-mentioned switch means is open upon deenergization of said second relay, an electric motor connected to said holding circuit and energized when said second switch means is closed, a cam connected to said motor so as to be driven thereby, and a switch operatively associated with said cam, said switch including a contact in the circuit of said first-mentioned relay which is closed when said cam is in its rest position, said last-mentioned switch including another contact forming a part of an auxiliary holding circuit for said motor, said second contact being engaged during rotation of said cam thereby to energize the second holding circuit for said motor, said first-mentioned holding circuit including switch means operatively associated with and adapted to be closed upon energization of said first-mentioned relay, said first-mentioned switch contact being disengaged when said second-mentioned contact is engaged, whereby the circuit to said first-mentioned relay is broken and said last-mentioned switch means are opened to break said first-mentioned holding circuit for said motor.

3. A control circuit for a camera having a shutter and a roll film magazine for taking successive X-ray pictures, in combination, a first relay connected across a pair of power lines so as to be energized thereby, a main switch connected across said lines to effect energization of said relay when closed, a second relay connected across said power lines, an X-ray switch in the circuit of said second relay adapted when closed to effect energization thereof, a third relay connected across said power lines, switch means in the circuit of said third relay and operatively associated with said second relay and adapted to be closed upon energization of said second relay, thereby to energize said third relay, means forming a holding circuit including closable switch means operatively associated with said third relay adapted to be closed when said third relay is energized, said last-mentioned switch means including a portion associated with the circuit of said third relay and adapted to maintain said third relay energized when closed, whereby said third relay continues to be energized when said first-mentioned switch means open upon deenergization of said second relay, an electric motor connected to said holding circuit and energized when said second switch means is closed, a cam connected to said motor so as to be driven thereby, a switch operatively associated with said cam, said switch including a contact in the circuit of said first-mentioned relay which is closed when said cam is in its rest position, said last-mentioned switch including another contact forming a part of an auxiliary holding circuit for said motor, said second contact being engaged during rotation of said cam thereby to energize the second holding circuit for said motor, said first-mentioned holding circuit including switch means operatively associated with and adapted to be closed upon energization of said first-mentioned relay, said first-mentioned switch contact being disengaged when said second-mentioned contact is engaged, whereby the circuit to said first-mentioned relay is broken and said last-mentioned switch means are opened to break said first-mentioned holding circuit for said motor, and a clutch operating solenoid connected across said motor so as to be energizable and deenergizable therewith.

LEONARD W. GACKI.
CARL J. BRASSER.

REFERENCES CITED

The following references are of record in the file of this patent:

UNITED STATES PATENTS

| Number | Name | Date |
|---|---|---|
| 2,205,853 | Jany | June 25, 1940 |
| 2,232,240 | Jones | Feb. 18, 1941 |
| 2,233,345 | Hineline | Feb. 25, 1941 |
| 2,372,425 | Jany | Mar. 27, 1945 |
| 2,396,874 | Nagel et al. | Mar. 19, 1946 |

FOREIGN PATENTS

| Number | Country | Date |
|---|---|---|
| 555,885 | Great Britain | Sept. 10, 1943 |
| 557,050 | Great Britain | Nov. 2, 1943 |